US007259675B2

(12) United States Patent
Baker et al.

(10) Patent No.: US 7,259,675 B2
(45) Date of Patent: Aug. 21, 2007

(54) PROCESS EQUIPMENT TRACKING SYSTEM

(75) Inventors: Kenneth D. Baker, Ambler, PA (US); David Greer, Perkasie, PA (US); Michael C. Needling, Norristown, PA (US); Gary Rozenblat, Sherman Oaks, CA (US); George Younan, Porter Ranch, CA (US)

(73) Assignee: NewAge Industries, Inc., Southampton, PA (US)

( * ) Notice: Subject to any disclaimer, the term of this patent is extended or adjusted under 35 U.S.C. 154(b) by 166 days.

(21) Appl. No.: 11/082,086

(22) Filed: Mar. 16, 2005

(65) Prior Publication Data

US 2005/0205658 A1    Sep. 22, 2005

Related U.S. Application Data

(60) Provisional application No. 60/553,511, filed on Mar. 16, 2004.

(51) Int. Cl.
*G08B 13/14* (2006.01)
(52) U.S. Cl. ............... 340/572.1; 340/10.1; 340/10.51; 235/375; 700/115
(58) Field of Classification Search ............... 340/10.1, 340/10.51, 572.1; 235/375; 700/115
See application file for complete search history.

(56) References Cited

U.S. PATENT DOCUMENTS

| | | | |
|---|---|---|---|
| 4,688,026 A | | 8/1987 | Scribner et al. |
| 5,461,385 A | | 10/1995 | Armstrong |
| 5,484,549 A | * | 1/1996 | Hei et al. .................... 510/370 |
| 5,674,381 A | | 10/1997 | Den Dekker |
| 5,910,776 A | * | 6/1999 | Black ......................... 340/10.1 |
| 5,923,001 A | | 7/1999 | Morris et al. |

(Continued)

FOREIGN PATENT DOCUMENTS

GB    2 303 082    2/1997

(Continued)

OTHER PUBLICATIONS

Website brochure from Rutten.com for RF identification System. Copyright 2004. Not Admitted Prior Art.

(Continued)

*Primary Examiner*—Jeffery Hofsass
*Assistant Examiner*—Hoi C. Lau
(74) *Attorney, Agent, or Firm*—Volpe and Koenig, P.C.

(57) ABSTRACT

A process equipment tracking system utilizing an attached RF ID tag attached to the process equipment during manufacture or thereafter. The RF ID tag is coded with an identification specific to the particular process equipment. An RF ID tag reader is provided, which is usable by a user to obtain the identification from the RF ID tag on the process equipment, preferably after the equipment is installed at the user facility. The RF ID tag reader includes a user input for at least one trackable event and can write data based on the at least one trackable event back onto the RF ID tag. The RF ID tag reader is at least one of connectable to a PC or the internet, or is compatible for uploading the identification and any user input to an internet accessible device. A process equipment database is provided, having process equipment-related information. The process equipment database provides access to a user to obtain the process equipment-related information based on the identification from the RF ID tag and receives and stores data related to the at least one trackable event.

29 Claims, 4 Drawing Sheets

U.S. PATENT DOCUMENTS

| | | | |
|---|---|---|---|
| 6,222,453 B1 * | 4/2001 | Joyce | 340/572.8 |
| 6,340,931 B1 * | 1/2002 | Harrison et al. | 340/572.1 |
| 6,343,690 B1 | 2/2002 | Britton et al. | |
| 6,605,223 B2 | 8/2003 | Jorgensen et al. | |
| 6,649,829 B2 | 11/2003 | Garber et al. | |
| 6,660,396 B1 * | 12/2003 | Warburton-Pitt | 428/447 |
| 6,691,064 B2 | 2/2004 | Vroman | |
| 6,936,160 B2 | 8/2005 | Moscaritolo et al. | |
| 6,994,253 B2 * | 2/2006 | Miller et al. | 235/385 |
| 2003/0023408 A1 | 1/2003 | Wight et al. | |
| 2003/0158795 A1 * | 8/2003 | Markham et al. | 705/28 |
| 2004/0132368 A1 * | 7/2004 | Price et al. | 442/247 |

OTHER PUBLICATIONS

Elga Labwater, PURELAB® Ultra, Ultra-Pure Water Polishing System. (2006—not admitted prior art).

* cited by examiner

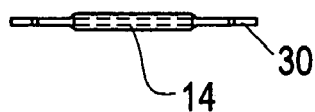
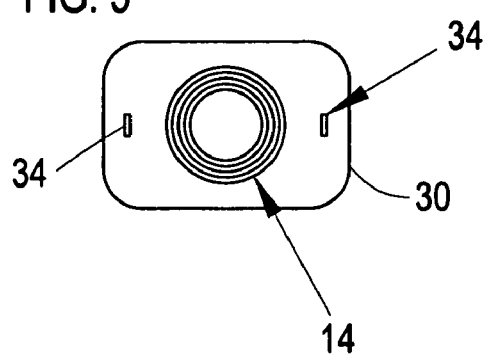
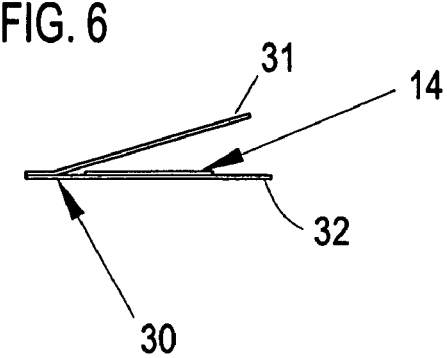
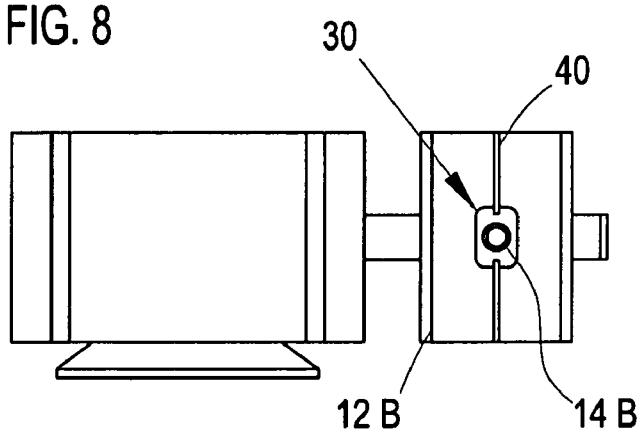
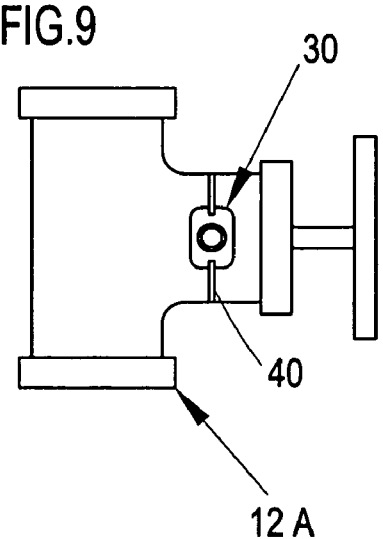
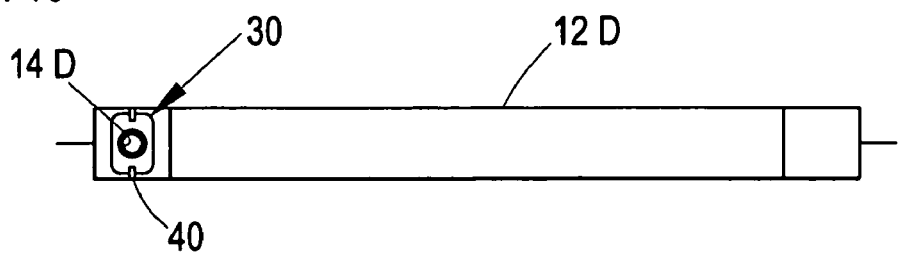

PROCESS EQUIPMENT TRACKING SYSTEM

BACKGROUND

The present invention relates to a tracking system, and in particular a tracking system which utilizes a radio frequency identification tag (RF ID tag) in order to track critical process equipment, provide access to supporting documents and specifications for the process equipment, and provide customer access to data related to the equipment, as well as cataloguing event-specific data related to the process equipment to allow the service life to be predicted and preferably a replacement to be ordered within a predetermined time period, preferably using an internet connection.

Systems are known for permanently associating and identifying indicia with a previously manufactured product. This is typically done in order to provide positive identification of the product. Such indicia may be visually readable by a user or machine-readable, such as via a magnetic strip reader or an optical or magnetic bar code. This type of identification has been done in accordance with specific industry requirements, where it is often required to specifically identify equipment utilized during different manufacturing steps. Placement of indicia on the equipment in as permanent a manner as possible provides identification and therefore the ability to identify the equipment throughout its usable life.

RF ID tags have also been known and have been adapted to various uses, such as inventory control and theft protection of items. The heart of an RF ID system is an information-carrying tag which functions in response to a coded RF signal received from a mobile reader or base station. The tag reflects the incident RF carrier back to the RF ID tag reader or base station and the information transferred as the reflected signal is modulated by the tag according to its programmed information protocol. RF ID tags may be active, in which a power source is provided, or passive, in which the energy for the reflected signal is derived from the RF signal from the base station or RF ID tag reader used to interrogate the tag. The RF ID tags can be programmed or encoded with specific information, such as an individual identification numbers for a product, such as serial numbers, and/or additional product information, depending upon the complexity of the RF ID tag. Read/write RF ID tags are also known which can be used to receive and store additional data.

In many industries, such as pharmaceutical, biotech and chemical industries, it is difficult to obtain good data with respect to the life of process equipment in view of the many requirements necessitated by various applications. Accordingly, it has been difficult to predict the expected life of certain process equipment, depending upon the particular application, and oftentimes process equipment for a particular application is discovered to be no longer serviceable when it fails in use, resulting in downtime while a new replacement part is procured, as well as loss of product being processed and/or contamination. The life of such process equipment can be affected by different factors, such as processing times, number of batches of material processed, as well as cleaning cycles. However, no efficient means exists to track these factors, and tracking becomes even more difficult when no specific identification is associated with the specific equipment in question, either through loss or labeling that cannot be read due to use and/or repeated cleanings.

Accordingly, it would be desirable to provide a better and more efficient means for attaching indicia to such process equipment as well as the ability to track predetermined events. It would also be desirable to be able to use the identification to obtain equipment-related data, specifications and certifications as required from a manufacturer. It would also be desirable to provide an easier and more efficient system for tracking equipment life so that replacements can be ordered in a timely manner prior to failure of the process equipment and within a projected life expectancy.

SUMMARY

Briefly stated, the present invention provides a process equipment tracking system. The system includes an attached RF ID tag that is provided with the equipment or optionally added at a later date. The RF ID tag is coded with an identification specific to the particular process equipment. An RF ID tag reader is provided, which is usable by a user to obtain the identification from the RF ID tag on the process equipment, preferably after the process equipment is installed at the user facility. The RF ID tag reader includes a user input for at least one trackable event, which can be, for example, an installation date, cleaning date or dates, and/or number of batches of material handled by the process equipment. The RF ID tag reader preferably has the ability to "write" data to the RF ID tag regarding the at least one trackable event or a series of trackable events, so that the data is specifically associated with the equipment for later reading, verification or data recovery. The RF ID tag reader is also preferably at least one of connectable to a PC for local data gathering and analysis, or to an internet or compatible for uploading the identification and any user input to an internet accessible device which, for example, can also be a PC.

At least one of a local and an internet accessible database is provided, having specific process equipment related information, including at least one of a manufacturing date, a batch number, a lot number, material specifications, material lot number, certificates of compliance, size specifications, functional specifications, description, customer data and customer application associated with the identification for the process equipment. The database provides access for a user to obtain the process-equipment related information based on the identification from the RF ID tag and receives and stores data related to the at least one trackable event, preferably by uploading the data from the RF ID tag reader.

In another aspect, the invention provides a method of tracking process equipment using a tracking system for obtaining process equipment data. The method includes: affixing an RF ID tag encoded with an identification on the process equipment; providing process equipment related information to a data base correlated to the identification; a user reading the RF ID tag with an RF ID tag reader; the user inputting at least one trackable event regarding the process equipment into the RF ID tag reader; the RF ID tag reader writing the information back on the RF ID tag; and uploading data from the RF ID tag reader to a PC or an internet accessible device or connecting the RF ID tag reader to an internet; accessing a data base; retrieving data relating to the process equipment from the data base using the identification; and uploading data on the at least one trackable event to the data base to build the data base.

BRIEF DESCRIPTION OF THE DRAWINGS

The foregoing Summary and the following detailed description will be better understood when read in conjunction with the following drawings, which illustrate preferred embodiments of the invention. In the drawings:

FIG. 5 is a plan view of a plastic laminate enclosed RF ID tag in accordance with a first alternative preferred embodiment of the invention.

FIG. 6 is a side view showing the RF ID tag being installed in the plastic laminate tag of FIG. 5.

FIG. 7 is a side view of the plastic laminate enclosed RF ID tag of FIG. 5.

FIG. 8 is an elevational view of the plastic laminate enclosed RF ID tag of FIG. 5 attached to processing equipment, and in particular a pump, using a cable tie.

FIG. 9 is an elevational view of the plastic laminate enclosed RF ID tag of FIG. 5 attached to process equipment, and in particular a valve, using a cable tie.

FIG. 10 is an elevational view of the plastic laminate enclosed RF ID tag of FIG. 5 attached to an ultra-violet lamp or filter used for processing using a cable tie.

DETAILED DESCRIPTION OF THE PREFERRED EMBODIMENT(S)

Figure 1:
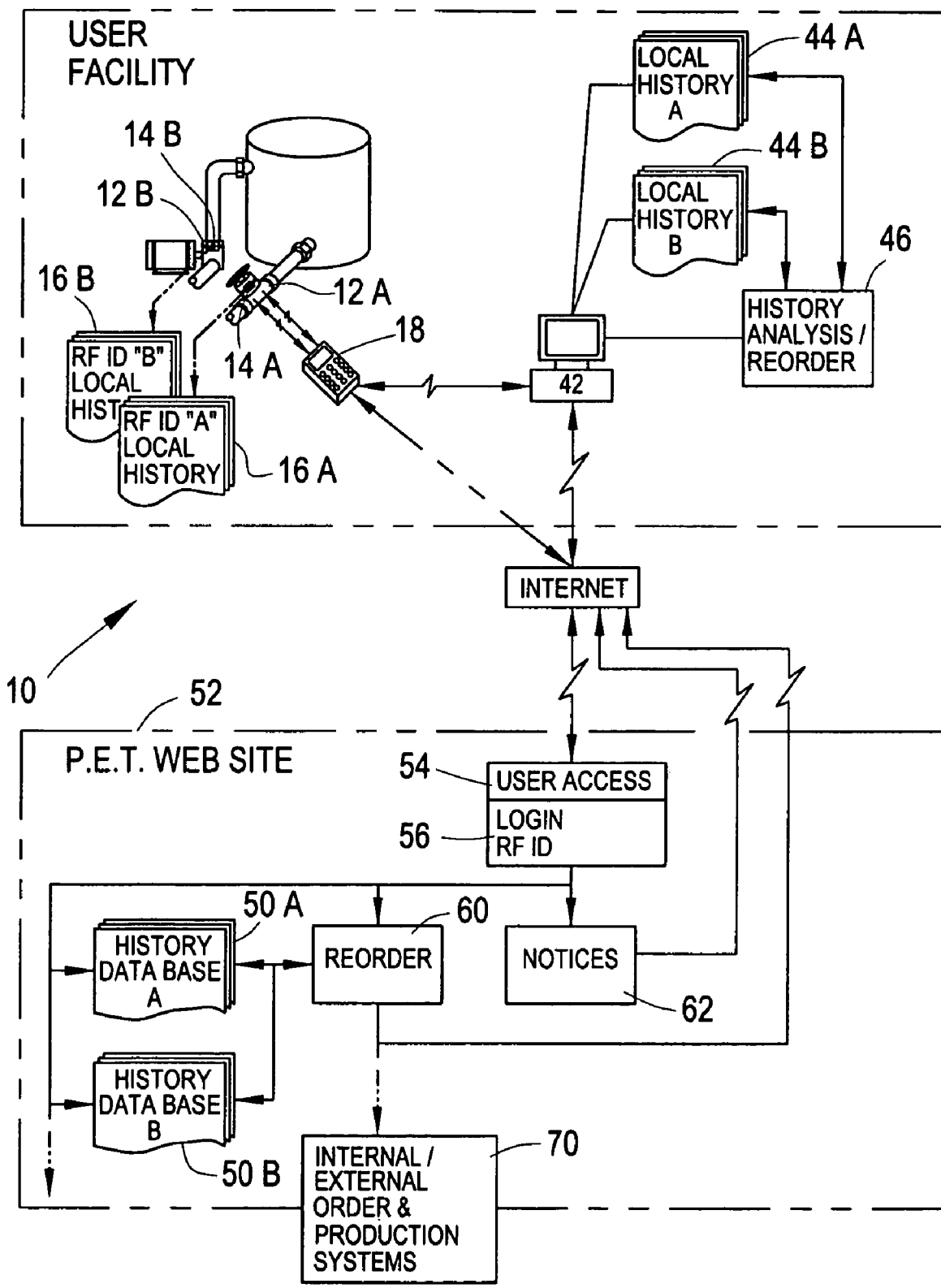
FIG. 1 is a schematic view showing the process equipment tracking system in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the process equipment and/or tools shown and designated parts thereof. The terminology includes the words above specifically mentioned, derivatives thereof and words of similar import.

Referring now to FIG. 1, a process equipment tracking (PET) system 10 in accordance with the present invention is shown. The process equipment tracking system 10 is used in conjunction with process equipment 12A, 12B with attached RF ID tags 14A, 14B (also generally referred to as RF ID tag 14). The RF ID tags 14A, 14B are of the type generally known in the art and may be an active or passive RF ID tag. Preferably, the RF ID tags 14A, 14B are encoded with at least an identification or serial number for the respective piece of process equipment 12A, 12B, which is assigned either by the manufacturer or by a vendor or user of the PET system 10 in order to allow each piece of process equipment 12A, 12B for which tracking is desired to be tracked individually.

While FIG. 1 only illustrates two pieces of process equipment 12A, 12B, which can be for example a process critical valve 12A and pump 12B being tracked, those skilled in the art will understand from the present disclosure that the PET system 10 can be used to track any number of pieces of process equipment, such as vessels, UV sterilizing lights, steam traps, or other equipment such as disposable bio processing bags that is critical in various pharmaceutical, biological and/or chemical processing applications. Tracking can relate to the process equipment life cycle, and/or cleaning or servicing requirements that require tracking either for compliance with specific purity and/or processing requirements mandated by specific industry standards bodies or the FDA. Tracking process equipment life cycles for specific equipment is also desirable for many end users who do not have any means to track and capture wear related data so that a replacement analysis or history can be established based on trackable wear events, such as batches processed, cleaning cycles or other wear factors.

The RF ID tag 14 is preferably able to withstand repeated heat cycles of up to 200° C., typical of process equipment cleaning operations through steam cleaning or autoclaving. Preferably, the RF ID tag 14 is also protected by an external pouch, mold strap or laminations as shown in FIGS. 2-3 or FIGS. 5-7, as discussed in detail below, in order to prevent premature failure in use.

Preferably, the RF ID tag 14 is attached to the process equipment 12A, 12B or other article to be tracked during manufacture, or is attached after the process equipment 12A, 12B is installed at a user facility based on a particular user's tracking requirements. The attachment methods can be varied, but a permanent or semi-permanent attachment is preferred so that the RF ID tag 14 cannot be inadvertently removed or tampered with.

Figure 3:
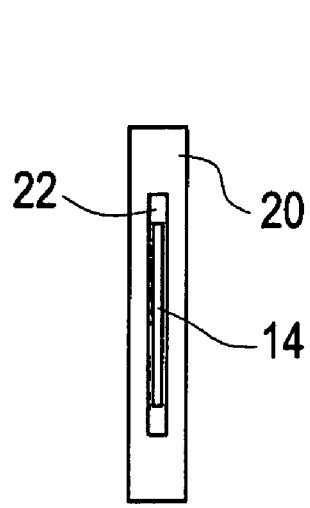
FIG. 3 is a side view of the pouch of FIG. 2.
Figure 2:
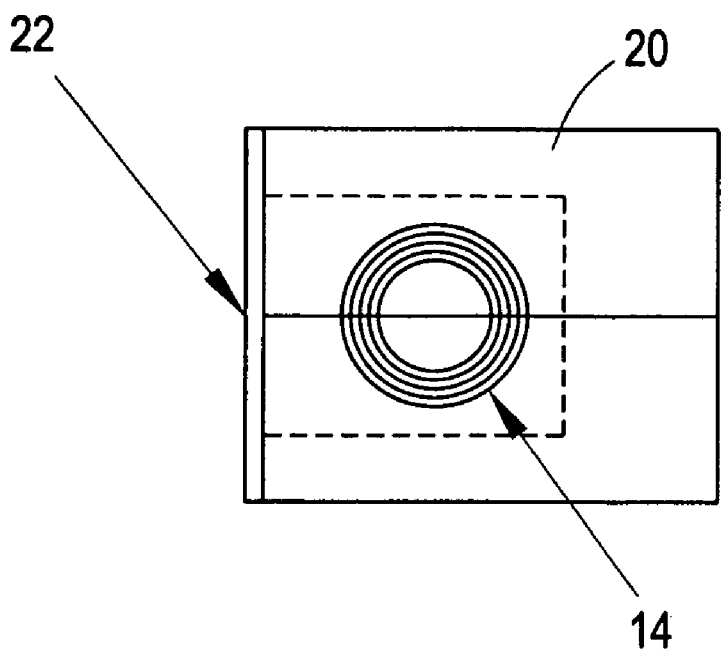
FIG. 2 is a side view of a preferred embodiment of a silicone pouch or mold strap enclosure for an RF ID tag in accordance with the present invention.
Figure 4:
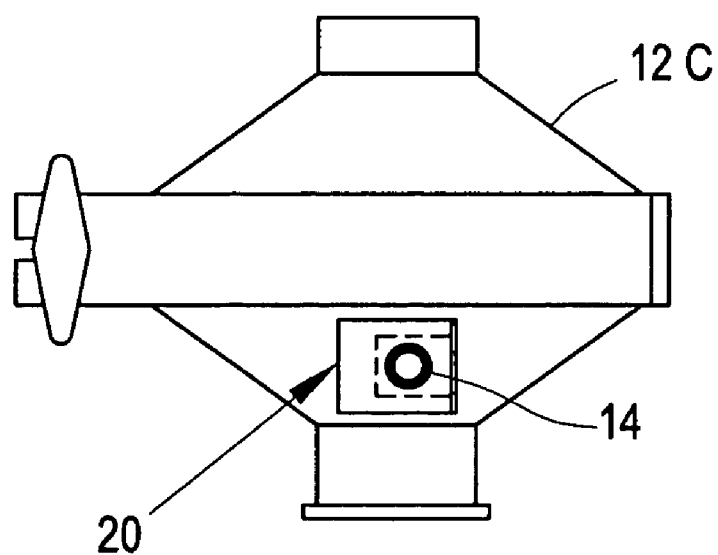
FIG. 4 is an elevational view of the silicone pouch enclosed RF ID tag of FIG. 2 shown in the installed position on a piece of processing equipment, such as a steam trap or pump.

In one preferred application for the process equipment tracking system 10, the RF ID tag 14 is sealed in a molded silicone pouch 20 using a liquid silicone end seal 22, as shown in FIGS. 2 and 3. The pouch 20 is then attached to the process equipment 12C, as shown in FIG. 4 by a suitable adhesive, which can be, for example, a silicone based adhesive. The pouch 20 can be formed of clear silicone, and other visually readable indicia can also be provided with the RF ID tag 14 in the pouch. This pouch 20 can be installed on the process equipment 12C at a manufacturer's facility or can be installed at the user site, if desired. While a silicone pouch 20 is preferred, other types of sealable housings can be utilized depending on the process equipment environment, types of cleaning, such as steam, chemical and/or autoclaving, as well as any other pertinent considerations.

Referring now to FIGS. 5-7, another holder 30 for the RF ID tag 14 according to a first alternative preferred embodiment of the present invention is shown. The holder 30 comprises two pieces of laminate 31, 32, preferably made of a suitable clear polymeric material, which can be for example PE or PP, that are connected together with a suitable adhesive with the RF ID tag 14 sandwiched between the laminates 31, 32. Slots 34 are provided in the holder 30 so that it can be attached to process equipment using a cable tie or safety wire 40. The holder 30 is shown with the RF ID tag 14B attached to the pump 12B in FIG. 8. FIG. 9 illustrates the holder 30 used to attach the RF ID tag 14A to the valve 12A using a cable tie 40. FIG. 10 shows the holder 30 with an RF ID tag 14D attached to an ultra violet light or filters 12D used for sterilizing materials being processed.

Figure 11:
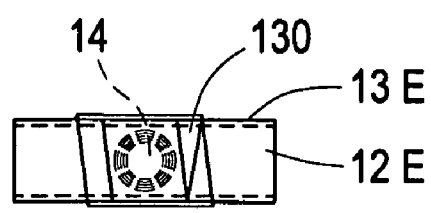
FIG. 11 is a side view of process equipment having a field installable RF ID tag encased in silicone tape in accordance with a second alternative preferred embodiment of the present invention.

Referring to FIG. 11, the RF ID tag 14 is encased on process equipment 12E by a layer of tape 130 according to a second alternative preferred embodiment of the present invention. The tape 130 is preferably a self-adhering tape such as a self fusing silicone or adhesive tape. During installation, the RF ID tag 14 is placed on a surface 13E of the process equipment 12E, and the tape 130 is wrapped once or more times around the process equipment 12E to secure the tag 14 to the process equipment 12E.

Figure 12:
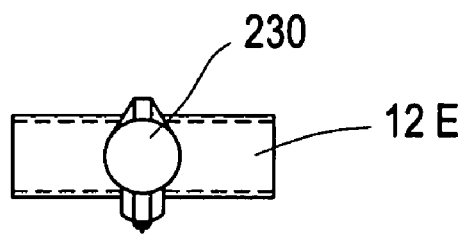
FIG. 12 is a side view of process equipment having a field installable RF ID tag enclosed in an encapsulating strap in accordance with a third alternative preferred embodiment of the present invention.
Figure 13:
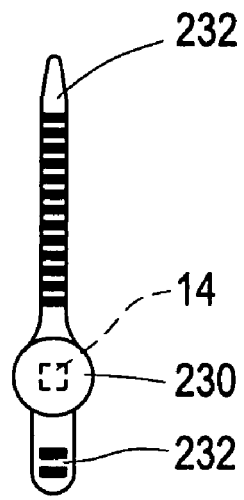
FIG. 13 is a plan view of the encapsulating strap shown in FIG. 12.

Referring to FIGS. 12 and 13, a strap 230 contains the RF ID tag 14 encapsulated therein according to a third alternative preferred embodiment of the present invention. The strap 230 includes interlocking portions 232 which can be connected for permanently or removably connecting the strap 230 to process equipment 12E. Preferably an adhesive, such as an RTV silicone sealant, is applied to the strap 230 to provide a permanent bond between the strap 230 and the process equipment 12E. Alternatively, a heat shrinkable polymer band or other pre-formed band can be bonded or otherwise affixed to the process equipment to connect an RF ID tag. For example, a pre-formed silicone band could be installed on the process equipment over the RF ID tag 14 and then be sealed in place using an RTV silicon sealant. The embodiments shown in FIGS. 8-13 and described above may be suitable in certain applications because they provide a field installable method for permanently attaching an RF ID tag. However, for process equipment that must be steam cleaned or autoclaved, the molded pouch 20 and laminated holder 30, as shown in FIGS. 2-3 and FIGS. 5-7, are preferred for preventing damage of the RF ID tag 14 which could be caused by an ingress of contaminants or cleaning agents.

Referring again to FIG. 1, the process equipment 12A, 12B, etc., is preferably installed at a user facility. This can be used for pharmaceutical and/or biochemical processing of drugs and/or other high purity requiring compounds and/or chemical processing facilities in which caustic materials are carried by the process equipment 12.

An RF ID tag reader 18 is provided, which is adapted to be used by a user to obtain the identification from the RF ID tag 14. Preferably, the RF ID tag reader 18 also includes a user input, preferably in the form of a keyboard, for tracking at least one trackable event. The trackable event can be related to an installation date of the process equipment, or it could also include a series of trackable events, such as how many times a piece of process equipment 12A, 12B is cleaned in place using chemical cleaners or steam, and/or is cleaned through removal of the process equipment and autoclaving the process equipment 12A, 12B. These trackable events in the context of the process equipment tracking system 10 preferably relate to wear and/or the service life of the process equipment 12A, 12B. Through the tracking of these events, it is possible to provide a more accurate method of predicting process equipment life and obtaining replacement process equipment prior to failure.

The RF ID tag reader 18 preferably also has a "write" capability and the RF ID tags 14A, 14B can be programmed with data on the at least one trackable event. In a preferred embodiment, the trackable event data is stored in an RF ID tag 14A, 14B data file 16A, 16B, so that the history of the trackable event or trackable events, such as cleaning dates or batches processed is actually stored in the RF ID tag data file 16A, 16B. This allows auditing of the history for the specific process equipment 12A, 12B trackable events, if required, for example by the FDA or some other agency requirement. Additionally, it prevents the loss of data from another piece of equipment, such as a PC, through hardware or software failure. In the preferred embodiment, the RF ID tag data file 16A, 16B can receive and store trackable event data on up to five different history events, such as cleaning dates, batch process dates, with up to 256 entries for each item. However, the type and amount of data stored can be varied, as desired, based on a particular application.

The RF ID tag reader 18 is also at least one of connectable to a PC 42 or an internet, for example, through a wireless connection as in PDAs or other wireless internet access devices (shown as a dashed line in FIG. 1), or is compatible for uploading the identification from the RF ID tag 14 and the user input to an internet accessible device, for example, a PC 40 as shown in FIG. 1. Such connections to the internet, either through a wireless connection and/or via a modem, DSL or Ti cable are generally known and accordingly, a further description is not necessary for those of ordinary skill in this field.

Preferably, a local process equipment track history database 44A, 44B is provided on the PC 42 in which data from the RF ID tag reader 18 can be stored and tracked for each piece of process equipment 12A, 12B being tracked. The PC 42 preferably also includes a history analysis and reorder system that is programmed using software to allow analysis of the local history databases 44A, 44B so that a user can determine a service life of the process equipment 12A, 12B based on the accumulated data in order to order replacement equipment.

Preferably, the PET system 10 also provides user access to a manufacturer or vendor of the PET system 10 for additional data and tracking ability based on the RF ID of the process equipment 12A, 12B. The user makes an internet connection to an internet accessible process equipment database 50A, 50B, preferably located in a website 52 operated by the process equipment manufacturer or other tracking organization. The internet accessible process equipment database 50 includes process equipment-related information, including but not limited to manufacturing date, batch number, lot number, material specifications, material lot number, certificates of compliance, size specifications, a description of the process equipment and any customer-related data with respect to the intended use or application. This information can all be provided in the process equipment database 50A, 50B, etc. by the user, or can be loaded by the manufacturer, and is associated or correlated with the RF ID tag 14A, 14B, etc. for the process equipment 12A, 12B, etc.

The internet accessible process equipment database 50 provides access to a user, preferably through a user access system 54, wherein a user logs in using a specific user ID at a log in screen 56. During the log in process, or thereafter, data on the at least one trackable event can be uploaded from the RF ID tag reader 18 or the internet access device 42 and can then optionally be stored in the PET website 52. This is preferably done based on the RF ID for the particular process equipment 12A, 12B, etc., in question, based on the data which has been collected by the user at the user facility. In one embodiment, the data related to the at least one trackable event is stored in a history database 50A, 50B, etc., which is used to store data on one or more trackable events, which in the preferred embodiment are related to process equipment life and process equipment wear.

Additionally, preferably a reorder system 60 is provided, which allows the user to reorder new process equipment based on the RF ID tag 14A, 14b, etc., identification. This is preferably used in connection with the RF ID and the respective database 50A, 50B, etc., so that all of the specifications for particular process equipment 12A, 12B, etc., can be obtained from the process equipment database 50 to streamline the reorder process. The local history database 44A, 44B and/or the history database 50A, 50B allow order patterns in comparison to the series of trackable events stored in the database to be compared and/or the trackable events can be used in connection with generating orders based on an expected replacement life of the process equipment 12A, 12B. Notices can preferably be generated and sent via e-mail or may be generated internally to send a reminder by mail or via other means.

Additionally, depending upon a user's needs, the ability to reorder can be provided by the reorder system 60, which generates an automatic reorder based on the process equipment database 50A, 50B, when the expected life of the process equipment 12A, 12B has almost expired. An automatic reorder notice can be sent via e-mail to the user over the internet, or it can be sent by other means. Additionally, the reorder system 60 communicates, preferably electronically, directly with the manufacturer's order and productions systems 70, which can be internal or external, so that manufacture of the new process equipment 12A, 12B is completed and the new process equipment shipped prior to expiration of the expected life of installed process equipment 12A, 12B. The process equipment local history database 44A, 44B and/or the PET website database 50A, 50B can then be updated, either directly or through an internet connection with the RF ID and process equipment data for the new process equipment.

In addition to reorders, notices can be sent to a user regarding at least one of maintenance information and/or recall information for the process equipment 12, which is accessible based on the RF ID tag identification when a user logs in using the user access connection, or which can be automatically generated and e-mailed to a user, as indicated at 62.

The system 10 preferably provides 24-hour access to a user of all information regarding any specific process equipment 12 via the internet and the unique process equipment identification provided by the RF ID tag 14. The system 10 also provides an easy and convenient way for a user to reorder existing process equipment, based on an existing specification in the process equipment database 50 for the particular user application.

The system 10 also provides a means for predicting the life of the process equipment by building the process equipment history database 44A, 44B, etc. locally or through the PET website databases 50A, 50B, which preferably include data related to one or more process equipment life related trackable events. In the case of process equipment 12 used in ultrapure material processing, such as pharmaceutical, biotech, cosmetic and/or food processing to track wear related events, these events can be the installation date of the process equipment, cleaning of the process equipment, which often involves caustic and/or material degrading processes, and the number of batches of material processed so that after a predictable number of events, replacement of the process equipment 12 can be accomplished prior to degradation or failure. By developing the process equipment history database 58 in conjunction with the user, the process equipment tracking system 10 provides for automatic notices regarding the expected expiration life of the process equipment and can even provide automatic reordering of the process equipment, so that a user does not face downtime when process equipment 12 fails in use or is no longer serviceable and a replacement must be obtained on an expedited basis.

Additionally, for processing equipment used to produce FDA-approved or tested products, the system provides a means for tracking items which can degrade during use and replacing them prior to any failure or contamination due to degradation.

By optionally providing automatic contact to the customer that process equipment 12 needs replacement and/or by providing an option for a customer to have automatic reordering carried out based upon the process equipment history database 50A, 50B, the present invention can streamline the ordering and replacement process and also avoids downtime associated with process equipment failures which could have been easily predicted.

In a method according to the invention, the process equipment tracking system 10 is used to track process equipment 12A, 12B and for obtaining process equipment data related to, for example, the manufacturing date, batch number, lot number, material specifications, material lot number, certificates of compliance, size specifications, description, customer data and/or customer application associated with a particular unique identification for the process equipment 12A, 12B. The RF ID tag 14A, 14B encoded with the particular identification for a piece of process equipment 12A, 12B is affixed to the process equipment, preferably through a reliable, and preferably semi-permanent or permanent connection. The process equipment information related to the process equipment 12A, 12B is loaded into a process equipment database 50 and correlated to the identification provided by the RF ID tag 14A, 14B for the particular process equipment. This can be done by a manufacturer or another service. In order to utilize this system, a user reads the RF ID tag 14A, 14B utilizing an RF ID tag reader 18. The user also inputs at least one trackable event regarding the process equipment 12A, 12B into the RF ID tag reader 18. The data from the RF ID tag reader 18, specifically data on the at least one trackable event, is written back to the RF ID tag 14A, 14B, so that there is a record of the trackable event associated directly with the process equipment 12A, 12B. The data along with the RF ID tag identification can also be uploaded from the RF ID tag reader 18 to PC 42 and stored in a local history database 44A, 44B based on the RF ID. The RF ID reader 18 itself may also be connected to the internet, for example, through a wireless or plug connection or the internet can be accessed from the PC 42. The user can then access the process equipment database 50 and retrieve data relating to the process equipment 12A, 12B using the specific identification provided by the RF ID tag 14A, 14B for the process equipment 12A, 12B. Additionally, data on the at least one trackable event is preferably uploaded to a database 50A, 50B in order to build the database. Preferably, a user can use the local history database 44A, 44B and/or log in to the process equipment tracking system 10 on a periodic basis and analyze data regarding a series of trackable events, for example, the number of times a piece of process equipment 12A, 12B was cleaned, the number of batches of material that were processed through the process equipment 12A, 12B and/or any other periodic trackable events that have an effect on process equipment life. Utilizing the data in the local database 44A, 44B, or the website database 50A, 50B, an expected process equipment life can be determined based on at least one of the process equipment history databases 44A, 44B, 50A, 50B. The website databases 50A, 50B can be used in conjunction with the reordering system 60. A user can determine a process equipment life expectancy based on the process equipment history database 44A, 44B or 50A, 50B, and reorder the process equipment.

In a preferred embodiment, the reorder system 60 interfaces with the process equipment database 50A, 50B and electronically notifies the user to reorder particular process equipment 12A, 12B for a specific application based upon an expiration of the determined process equipment life expectancy. This can also be done automatically to reorder the process equipment 12A, 12B prior to an expiration of a process equipment life expectancy.

While the preferred embodiment of the invention is directed to tracking a process equipment life expectancy and allowing automatic reordering as well as access to all the process equipment data using the process equipment tracking system 10, this could be used in other applications.

What is claimed is:

1. A process equipment tracking system, comprising:
   an attached RF ID tag and an attachment device adapted to attach the RF ID tag to a piece of process equipment;
   an RF ID tag reader/writer useable by a user to obtain the identification from the RF ID tag on the process equipment and including a user input for at least one trackable event, and being able to write data on the at least one trackable event onto the RF ID tag, the RF ID tag reader being at least one of connectable to an internet or compatible for uploading the identification and the user input to a network access device;
   a data base having process equipment related information, including at least one of manufacturing date, replacement date, batch number, lot number, material specifications, material lot number, certificates of compliance, size specifications, fitting specifications, description, customer data, batch process description, cleaning operations and customer application associated with the identification for the process equipment, the data base provides access to a user to obtain the process equipment related information based on the identification and receives and stores data related to the at least one trackable event; wherein the data related to the at least one trackable event is stored in at least one of a local process equipment history data base and an internet accessible history database, which is used to store data on a series of trackable events; and
   an automatic notice generation system which interrogates the process equipment data base regarding an expected replacement life of the process equipment, and generates an electronic notice to the user prior to an expiration of the process equipment expected replacement life.

2. The process equipment tracking system of claim 1, further comprising a user interface and a re-order database provided with the database which allows a user to re-order new process equipment based on the RF ID tag identification.

3. The process equipment tracking system of claim 1, further comprising a user notice database having at least one of maintenance information and recall information for the process equipment which is accessible based on the RF ID tag identification.

4. The process equipment tracking system of claim 1, wherein the network access device includes a computer.

5. The process equipment tracking system of claim 1, wherein the process equipment comprises at least one of a valve, a vessel, a pump, a filter, a bio processing bag, and a UV lamp used in a pharmaceutical or chemical processing system.

6. The process equipment tracking system of claim 1, wherein the attachment device includes a molded silicone pouch which contains the RF ID tag.

7. The process equipment tracking system of claim 1, wherein the attachment device includes at least two pieces of polymeric laminate material which encase the RF ID tag therebetween.

8. The process equipment tracking system of claim 1, wherein the attachment device includes a tape which connects the RF ID tag to the piece of process equipment.

9. The process equipment tracking system of claim 1, wherein the attachment device includes an encapsulated RF ID strap which contains the RF ID tag, the strap including interlocking portions which connect the strap to the piece of process equipment.

10. The process equipment tracking system of claim 9, further comprising an adhesive which adheres the RF ID strap to the piece of process equipment.

11. A method of tracking a piece of process equipment using a tracking system for obtaining process equipment data, comprising:
    affixing an RF ID tag encoded with an identification on the process equipment;
    providing process equipment information relating to the process equipment in a process equipment data base correlated to the identification;
    a user reading the RF ID tag with an RF ID tag reader;
    the user inputting data on at least one trackable event regarding the process equipment into the RF ID tag reader;
    writing the data on the at least one trackable event onto the RF ID tag;
    uploading data from the RF ID tag reader to a PC, an internet accessible device or connecting the RF ID tag reader to an internet;
    accessing the process equipment data base;
    retrieving data relating to the process equipment from the process equipment data base using the identification;
    uploading data on the at least one trackable event to a process equipment history data base to build the process equipment history data base; and
    calculating an expected process equipment life based on the process equipment history data base.

12. The method of claim 11, wherein the trackable event is a process equipment wear related event.

13. The method of claim 11, further comprising:
    a user using the internet and logging into a host web site; and
    the uploading of the data relating to the at least one trackable event regarding the process equipment includes uploading data on a series of trackable events.

14. The method of claim 11, further comprising:
    reordering replacement process equipment based on the process equipment data base and the process equipment identification.

15. The method of claim 11, further comprising:
    automatically notifying the user regarding maintenance and/or recall.

16. A method of tracking a piece of process equipment using a tracking system for obtaining process equipment data, comprising:
    affixing an RF ID tag encoded with an identification on the process equipment;
    providing process equipment information relating to the process equipment in a process equipment data base correlated to the identification;
    a user reading the RF ID tag with an RF ID tag reader;
    the user inputting data on at least one trackable event regarding the process equipment into the RF ID tag reader;

writing the data on the at least one trackable event onto the RF ID tag;

uploading data from the RF ID tag reader to a PC, an internet accessible device or connecting the RF ID tag reader to an internet;

accessing the process equipment data base;

retrieving data relating to the process equipment from the process equipment data base using the identification; and uploading data on the at least one trackable event to a process equipment history data base to build the process equipment history data base;

wherein the at least one trackable event relates to at least one of: process equipment cleaning, a number of batches of material processed or passed through process equipment, and an installation date of process equipment.

17. The method of claim 16, further comprising:

reordering replacement process equipment based on the process equipment data base and the process equipment identification.

18. The method of claim 16, further comprising:

automatically notifying the user regarding maintenance and/or recall.

19. The method of claim 16, further comprising:

a user using the internet and logging into a host web site; and the uploading of the data relating to the at least one trackable event regarding the process equipment includes uploading data on a series of trackable events.

20. A method of tracking a piece of process equipment using a tracking system for obtaining process equipment data, comprising:

affixing an RF ID tag encoded with an identification on the process equipment;

providing process equipment information relating to the process equipment in a process equipment data base correlated to the identification;

a user reading the RF ID tag with an RF ID tag reader;

the user inputting data on at least one trackable event regarding the process equipment into the RF ID tag reader;

writing the data on the at least one trackable event onto the RF ID tag;

uploading data from the RF ID tag reader to a PC, an internet accessible device or connecting the RF ID tag reader to an internet;

accessing the process equipment data base;

retrieving data relating to the process equipment from the process equipment data base using the identification;

uploading data on the at least one trackable event to a process equipment history data base to build the process equipment history data base; and determining a process equipment life expectancy based at least on the process equipment history data base; and interfacing with the process equipment history data base and electronically notifying the user to reorder prior to an expiration of the determined process equipment life expectancy.

21. The method of claim 20, further comprising:

reordering replacement process equipment based on the process equipment data base and the process equipment identification.

22. The method of claim 20, further comprising:

automatically notifying the user regarding maintenance and/or recall.

23. The method of claim 20, further comprising:

a user using the internet and logging into a host web site; and the uploading of the data relating to the at least one trackable event regarding the process equipment includes uploading data on a series of trackable events.

24. The method of claim 20, wherein the trackable event is a process equipment wear related event.

25. A method of tracking a piece of process equipment using a tracking system for obtaining process equipment data, comprising:

affixing an RF ID tag encoded with an identification on the process equipment;

providing process equipment information relating to the process equipment in a process equipment data base correlated to the identification;

a user reading the RF ID tag with an RF ID tag reader;

the user inputting data on at least one trackable event regarding the process equipment into the RF ID tag reader;

writing the data on the at least one trackable event onto the RF ID tag;

uploading data from the RF ID tag reader to a PC, an internet accessible device or connecting the RF ID tag reader to an internet;

accessing the process equipment data base;

retrieving data relating to the process equipment from the process equipment data base using the identification;

uploading data on the at least one trackable event to a process equipment history data base to build the process equipment history data base; and interfacing with the process equipment data base and electronically notifying the user to reorder prior to an expiration of a process equipment life expectancy.

26. The method of claim 25, further comprising:

reordering replacement process equipment based on the process equipment data base and the process equipment identification.

27. The method of claim 25, further comprising:

automatically notifying the user regarding maintenance and/or recall.

28. The method of claim 25, further comprising:

a user using the internet and logging into a host web site; and the uploading of the data relating to the at least one trackable event regarding the process equipment includes uploading data on a series of trackable events.

29. The method of claim 25, wherein the trackable event is a process equipment wear related event.

\* \* \* \* \*